(12) United States Patent
Robert et al.

(10) Patent No.: US 9,659,408 B2
(45) Date of Patent: May 23, 2017

(54) MESH RECONSTRUCTION FROM HETEROGENEOUS SOURCES OF DATA

(71) Applicant: Autodesk, Inc., San Rafael, CA (US)

(72) Inventors: Luc Franck Robert, Valbonne (FR); Emmanuel Gallo, Mougins (FR)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 14/555,409

(22) Filed: Nov. 26, 2014

(65) Prior Publication Data

US 2015/0146971 A1 May 28, 2015

Related U.S. Application Data

(60) Provisional application No. 61/909,847, filed on Nov. 27, 2013.

(51) Int. Cl.
*G06T 17/20* (2006.01)
*G06T 7/593* (2017.01)
*G06T 7/557* (2017.01)

(52) U.S. Cl.
CPC .............. *G06T 17/20* (2013.01); *G06T 7/557* (2017.01); *G06T 7/593* (2017.01); *G06T 2200/08* (2013.01); *G06T 2207/10008* (2013.01); *G06T 2207/10012* (2013.01)

(58) Field of Classification Search
None
See application file for complete search history.

(56) References Cited

U.S. PATENT DOCUMENTS

| 7,720,647 | B2* | 5/2010 | Chang | G06T 17/00 702/190 |
| 2012/0243774 | A1* | 9/2012 | Chen | G06T 15/205 382/154 |
| 2012/0307010 | A1* | 12/2012 | Evertt | G06T 7/0083 348/46 |
| 2013/0100119 | A1* | 4/2013 | Evertt | G06K 9/00201 345/419 |
| 2015/0154795 | A1* | 6/2015 | Ogale | G06T 7/0075 345/420 |

OTHER PUBLICATIONS

Yin, J., et al., "A New Photo Consistency Test for Voxel Coloring", Proceedings of the Second Canadian Conference on Computer and Robot Vision (CRV'05), IEEE, May 9-11, 2005, pp. 566-570.
"Photo-consistency", Wikipedia, the free encyclopedia, last modified Sep. 7, 2016. https://en.wikipedia.org/wiki/Photo-consistency.

* cited by examiner

*Primary Examiner* — Gandhi Thirugnanam
*Assistant Examiner* — Jiangeng Sun
(74) *Attorney, Agent, or Firm* — Gates & Cooper LLP (57) ABSTRACT

A system, apparatus, method, computer program product, and computer readable storage medium provide the ability to reconstruct a surface mesh. Photo image data is obtained from a set of overlapping photographic images. Scan data is obtained from a scanner. A point cloud is generated from a combination of the photo image data and the scan data. An initial rough mesh is estimated from the point cloud data. The initial rough mesh is iteratively refined into a refined mesh.

16 Claims, 4 Drawing Sheets

MESH RECONSTRUCTION FROM HETEROGENEOUS SOURCES OF DATA

CROSS-REFERENCE TO RELATED APPLICATIONS

This application claims the benefit under 35 U.S.C. Section 119(e) of the following and commonly-assigned U.S. provisional patent application(s), which is/are incorporated by reference herein:

Provisional Application Ser. No. 61/909,847, filed on Nov. 27, 2013, by Luc Franck Robert and Emmanuel Gallo, entitled "Mesh Reconstruction from Heterogeneous Sources of Data,".

BACKGROUND OF THE INVENTION

1. Field of the Invention

The present invention relates generally to reality capture data, and in particular, to a method, apparatus, and article of manufacture for reconstructing a three-dimensional (3D) mesh from reality capture data.

2. Description of the Related Art

It may be desirable to accurately construct/reconstruct a 3D mesh based on data from a variety of sources (e.g., laser scans, Kinect scans, photos, etc.). Prior art systems provide algorithms to produce a mesh out of single sources of data (e.g., a point cloud) (e.g. products available from Geomagic™ Inc.). However, today, the only approach to mesh reconstruction from hybrid data (i.e., from multiple sources) would be to reconstruct point clouds for each modality independently (e.g. photogrammetry and scan), then run a surfacing algorithm on the resulting consolidated point cloud. In such an approach, each modality proceeds independently from the others, so there is no guarantee that one source modality will accurately integrate with another source modality (e.g., that a photogrammetry reconstruction process will produce a point cloud that is close to the scan data). Further, the resulting point clouds may be different enough that combining the point clouds into a single surface could be a challenge, or even impossible. In embodiments of the invention, all modalities co-operate in the same minimization process, and "help" each other in guiding the process towards the right solution.

SUMMARY OF THE INVENTION

Embodiments of the invention provide a new method to automatically reconstruct a highly accurate 3D mesh from reality capture data into a one-step method that optimally combines information from any combination of modalities (e.g., laser scans, Kinect™ scans, photos, and any other representation that can be converted into a set of depth maps).

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention propose a new method to automatically reconstruct a highly accurate 3D mesh from reality capture data into a one-step method that optimally combines information from any combination of laser scans, Kinect™ scans, photos, and any other representation that can be converted into a set of depth maps.

The approach can be seen as a generalization of several existing approaches for 3D reconstruction, such as photogrammetry (e.g. Photofly™) or pure 3D-based reconstruction (Kinect Fusion™ or Poisson surface reconstruction). When only photos are available, embodiments of the invention perform (i.e., in terms of accuracy and speed) at least as well as the photogrammetry engine available from Photofly™ When point cloud data is available, embodiments of the invention perform at least as well as a standard surface reconstruction. When both types of data are present (i.e., photos and point cloud data), embodiments of the invention optimally fuse data from both sensors, to obtain a high quality 3D mesh.

Hardware Environment

Figure 1:
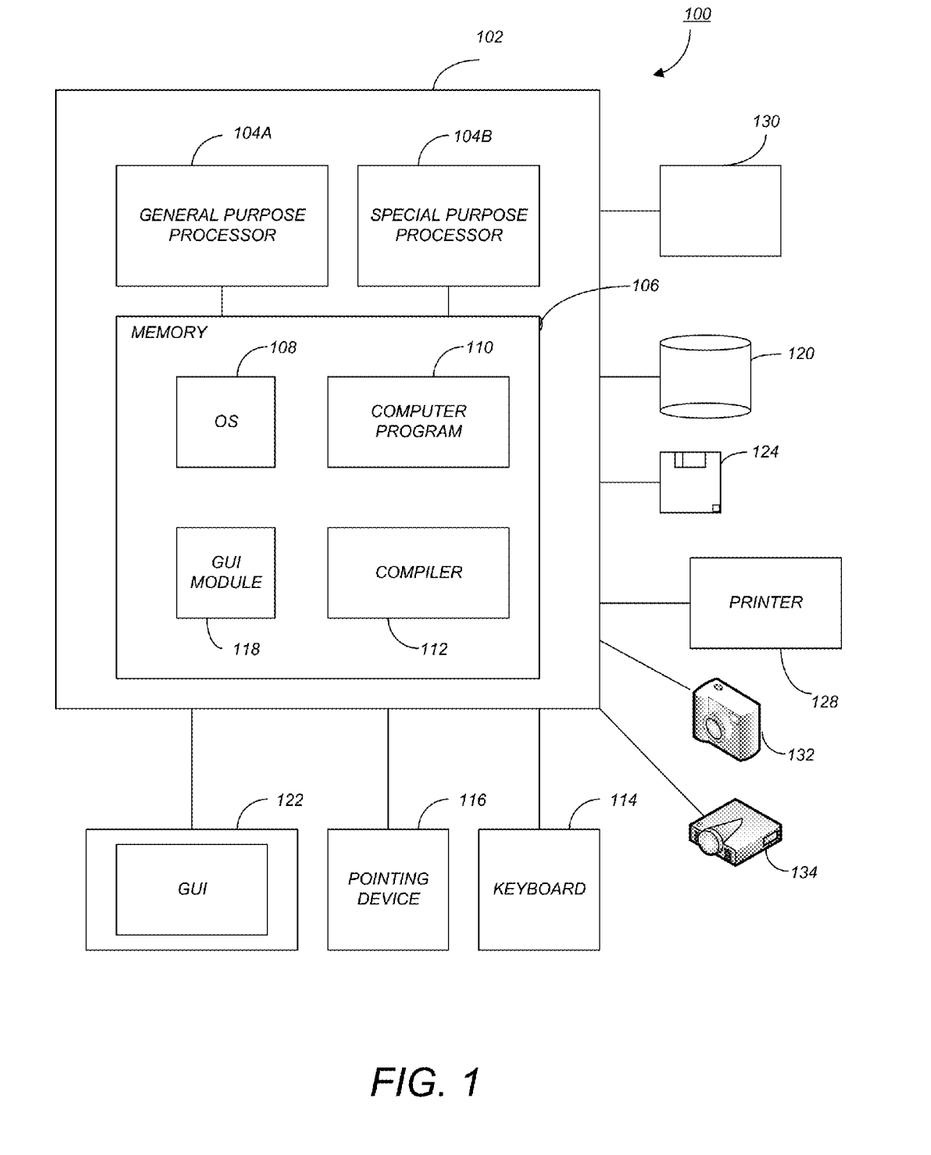
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128.

In one or more embodiments, computer 102 may be coupled to, or may comprise, a camera or photo capturing device 132 (e.g., a digital camera, a cellular phone, a personal digital assistant, etc.). In yet another embodiment, the computer 102 may comprise a multi-touch device, mobile phone, gaming system, internet enabled television, television set top box, or other internet enabled device executing on various platforms and operating systems.

In one or more embodiments, computer 102 is communicatively coupled to, or may comprise, a laser scanner 134. Such a laser scanner 134 may consist of a field measurement device capable of producing a 3D representation of present conditions through the collection of individually measured points. The set of all points collected and registered with another after the scanning process is referred to as a point cloud. Such a point cloud may be stored in data storage devices 120/124, within the scanner 134, in memory 106, and/or in any other device capable of storing such information. The laser scanner 134 may utilize a variety of scanning methods including aerial, static, and mobile. Such laser scanning may scan millions of point in seconds without climbing on equipment and/or conducting contact measurements.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs). Such multi-touch devices may also be integrated with or contain image capture capabilities such as a lens/camera 132, etc.

Some or all of the operations performed by the computer 102 according to the computer program 110 instructions may be implemented in a special purpose processor 104B. In this embodiment, some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transitory computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106, data storage device 120/124 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
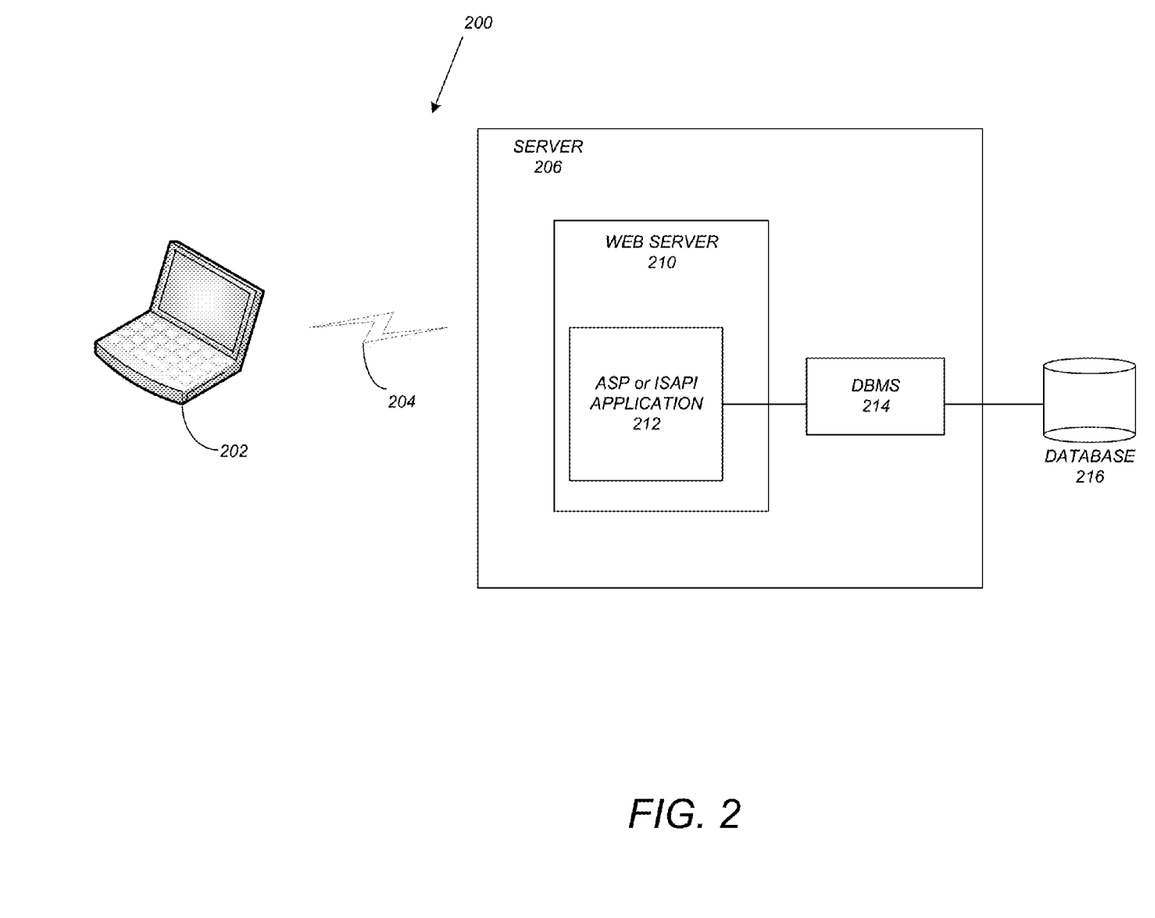
FIG. 2 schematically illustrates a typical distributed computer system using a network to connect client computers to server computers in accordance with one or more embodiments of the invention.

FIG. 2 schematically illustrates a typical distributed computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Clients 202 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 202 may be downloaded from server computer 206 to client computers 202 and installed as a plug-in or ACTIVEX™ control of a web browser. Accordingly, clients 202 may utilize ACTIVEX™ components/component object model (COM) or distributed COM (DCOM) components to provide a user interface on a display of client 202. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206.

Embodiments of the invention may be implemented as a software application on a client 202 or server computer 206. Further, as described above, the client 202 or server computer 206 may comprise a thin client device or a portable device that has a multi-touch-based display.

Logical Flow

Figure 3:
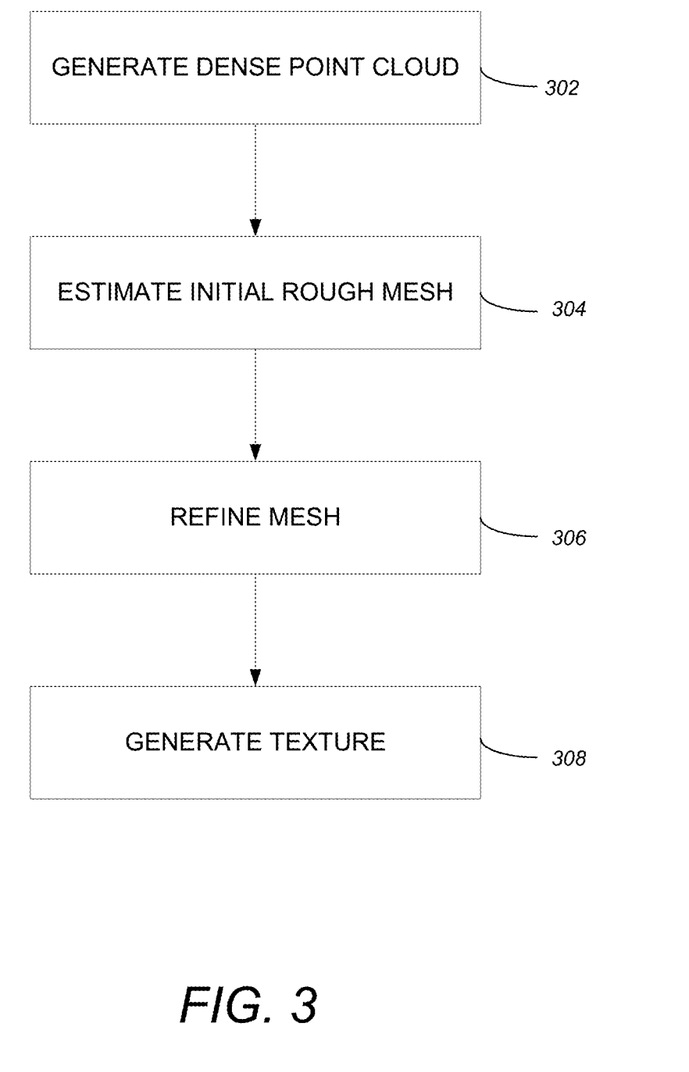
FIG. 3 illustrates the logical flow for reconstructing a polygonal mesh from heterogeneous sources of data in accordance with one or more embodiments of the invention.

FIG. 3 illustrates the logical flow for reconstructing a polygonal mesh from heterogeneous sources of data in accordance with one or more embodiments of the invention. The mesh reconstruction pipeline is divided into four (4) steps: (1) at step 302, a dense point cloud is generated from both camera input data and scan data (e.g., the image and the camera calibration); (2) at step 304, an initial rough/coarse mesh is estimated; (3) at step 306, the mesh is refined; and (4) at step 308, a texture is generated and/or displayed.

For the surface initialization at step 302, source data is a hybrid from a variety of sources including point cloud data from a scanner or Kinect™ like sensor, and overlapping photos. In this regard, embodiments of the invention can apply to any combination of source data, as long as each data can convert into a function that, for a given set of rays in space and a point in 3D (typically on a polygon of a surface evolving towards the solution), can tell in what direction, and potentially what distance, the point should move along the ray to get closer to the surface. Examples of the source data and the associated function that can be used include:

- A depth map is such a function: for a surface point in space hit by a ray of the depth map, one directly knows the depth difference along the ray between the depth map and the surface;
- Photo-consistency: by looking at photo-consistency between several images projected onto the surface, one knows how the surface should evolve to increase a photo-consistency measure. Classical measures used in stereo reconstruction are zero-normalized cross-correlation (ZNCC), Sum of Squared Differences (SSD), Sum of Absolute Differences (SAD).
- A Kinect™ or RGBD (Red Green Blue Depth) image provides two sources of information that can be used in the same reconstruction process, like in the two points above: a depth map, and a picture that can be used for photo-consistency with another Kinect™ image, or with a picture coming from a DSLR (digital single lens reflex) camera, or from any other device producing a photo.
- Parametric surface descriptions, such as coming from a CAD (computer aided design) model, fit this model.
- A polygon mesh can be used as well to derive depth maps, from any given set of arbitrary viewpoints, that can be used in the process.
- User-defined 3D data (e.g., via strokes in the Mudbox™ application (digital sculpting and digital painting software), can be used through the same principles.
- Any data that can be rendered into a depth buffer from a known viewpoint can be integrated into this framework.
- Light field cameras (e.g., available from Lytro™) provide images that can be used as photos. With these devices, it is also possible to estimate depth by the slope of iso-color pixels (i.e., pixels having the same/similar color) through adjacent rays. By looking at the iso-value pixel slope at a given location in the light field, one can derive a depth evolution value for the surface point projecting at this location.

The point cloud generation step 302 may also be viewed as the extraction of a rough dense point cloud. All 3D scene details are captured during the generation/extraction process. As described above, point cloud data may be directly acquired based on scanner input (e.g., a Kinect™ based scan or a laser scanner). However, due to the size of directly acquired scanner input, scan simplification may be performed to remove redundant data and keep important details. Scan simplification may include a clustering method (keeping one representative by cluster), an estimate of the surface variation (covariance analysis), the recursive splitting of clusters, etc.

In addition, part or all of the point cloud data may be obtained from photographs. To acquire the point cloud data from a photograph, pair-wise matching may be used via a plane sweep algorithm for the photographs. To extract points via the plane sweep algorithm, a photo-consistency score per pixel between pair-wise images (and/or between the set of overlapping photographic images) may be evaluated. The pair-wise images are projected into a moving fronto-parallel plane, outliers may be removed by imposing a symmetry constraint, and the matching scores are maximized locally over the depth. Such a process may be performed by a graphics processing unit (GPU) executing within a computer.

Further, photo image data may be obtained from a set of overlapping photographic images. Such photo image data includes all of the information that is necessary to establish the relation between a pixel in the image and a ray in space. For example, the photo image data may include the image data itself as well as associated pose information in space (rotation, translation) and intrinsic parameters (focal length, non-linear distortion, principal point, etc.).

When extracting/generating the point cloud, the point cloud data may be refined, clustered, filtered, and outliers may be removed. To cluster the point cloud, a top-to-bottom approach is used. One starts with one cluster and its surface variation is estimated. The surface variation quantifies how strong the surface deviates from the tangent plane. Then, the cluster is recursively split until the surface variation is lower than a defined threshold or the size of the cluster is below a certain number of points. The split plane is defined by centroid and axis of greatest variation.

Once the dense point cloud is generated from the hybrid of sources at step 302, an initial rough/coarse mesh is estimated/created at step 304. To create the coarse mesh, a 3D Delaunay tessellation of the point clouds may be built. The 3D Delaunay triangulation is a triangulation such that the circumsphere of every tetrahedron does not contain any points. To extract the surface from the 3D Delaunay, all tetrahadra are classified as inside or outside. For each 3D segment defined by a 3D point (and the 3D location of the camera where the point comes from), all tetrahedra intersected are penalized. Thereafter, empty tetrahedral are rejected using a graph cut algorithm. Alternatively, any other method may be used to estimate the rough mesh (e.g., Poisson reconstruction). Further, when creating the mesh, visibility information may also be utilized (e.g., information for each point that indicates from which viewpoint the point has been seen). Such visibility information may be utilized during mesh refinement to determine where the surface should be.

Accordingly, an initial rough mesh is estimated that is close enough to converge to the global solution. To ensure the rough mesh is close enough to converge to the global solution, the mesh may be projected onto one of the images that is used to refine the position of the mesh. If one examines the mesh from an image viewpoint, a displacement may be visible. Such a displacement is measured in terms of pixels and the smaller the displacement, the more likely the mesh will converge towards the global solution. Typical acceptable displacement values are of a few pixels (e.g. up to 5), and depend strongly on the signal in the images.

The mesh is then refined at step 306. Such a mesh refinement step may also be referred to as a hybrid surface evolution. The mesh refinement is performed iteratively by optimizing a combination of two criteria: (1) the photo-consistency of images seeing the surface; and (2) the signed surface distance to the point cloud for scan based data. In addition to these criteria, an additional regularization term may impose some regularity (continuity, smoothness, etc.) properties on the mesh while it evolves. In other words, the mesh refinement may utilize an error function that is based on a signed surface distance to the point cloud for the scan data. Further, the refining process may combine the error function and a surface reprojection error for the photo image data (where the surface reprojection error is based on a photo-consistency score between the set of overlapping photographic images back-projected onto the initial rough mesh). The mesh refinement may also be performed by a GPU.

At step 308, the texture surface is generated from the refined mesh based on red, green, blue (RGB) data from the photo image data and/or the scan data. Further, the textured surface may be displayed, processed, output, and/or utilized by a user.

Figure 4:
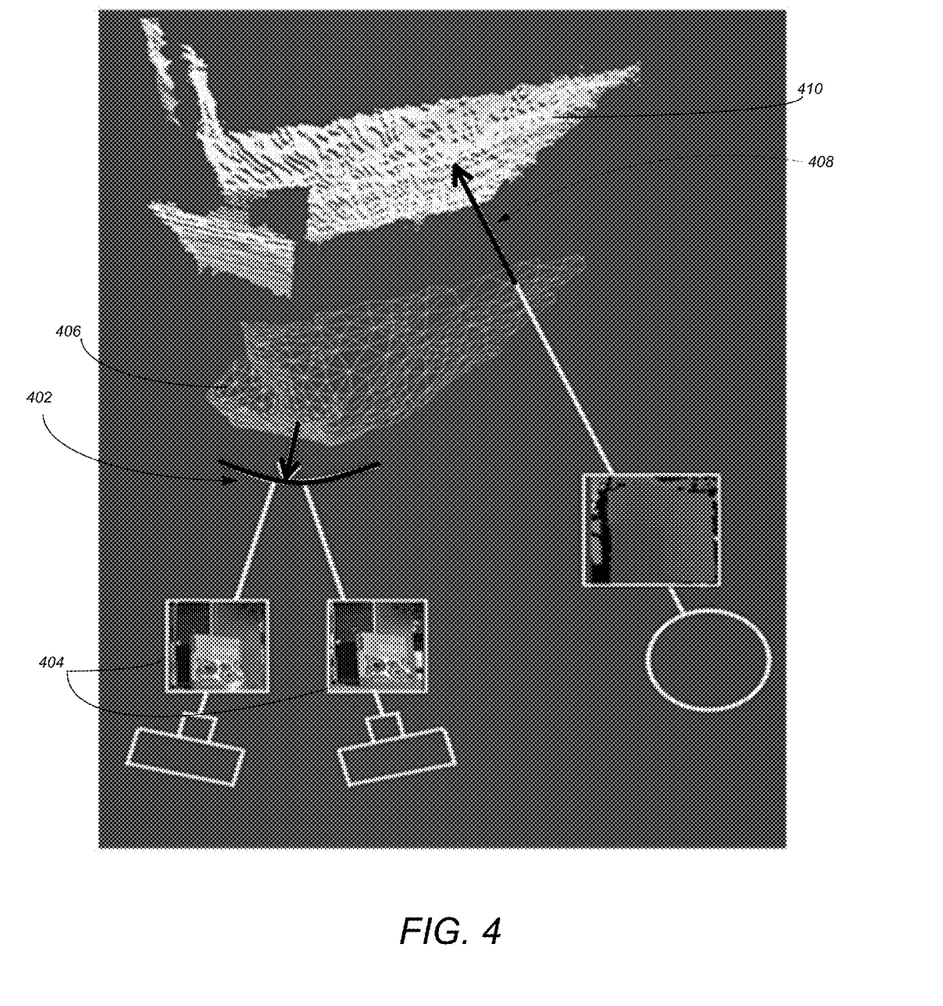
FIG. 4 illustrates the error function that is minimized by the mesh reconstruction process in accordance with one or more embodiments of the invention.

FIG. 4 illustrates the surface cost function that is minimized by the mesh reconstruction process in accordance with one or more embodiments of the invention. The surface cost function combines a picture-based term with a scan-based term. The picture-based term measures photo-consistency for pairs of images 404 (as illustrated by lines 402). It contributes to surface evolution so as to maximize photo-consistency between all considered image pairs, over the whole 3D surface 406.

The scan-based term measures the 3D distance (represented by line 408) between the mesh surface 406 and the input point cloud 410. It contributes to surface evolution so as to minimize this 3D distance.

A global score is computed per surface element, that combines both the correlation score and the 3D distance, for instance with a linear combination. A weighting scheme can be used to specify the relative importance of the photo term vs the scan term. To compute the global score, for each element of the refined surface mesh 406, a displacement is computed, combining all displacement contributions associated with the underlying data (e.g., acquired from the correlation score 402 or the 3D distance 408). The displacement is used to evolve the surface in order to minimize the global score.

Accordingly, embodiments of the invention provide a new hybrid surface evolution process that both maximizes photo-consistency for images, and minimizes a signed distance function to the point cloud for depth data. In particular, embodiments of the invention overcome problems with creating an accurate surface mesh based solely on photos that are homogeneous and lack certain information, or based solely on scans that are unreliable with black/dark surfaces and lack sharp edges. Instead, embodiments of the invention combine input from both photos and scan-based data to provide a reliable and accurate result in an efficient manner.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention automatically (e.g., without additional user input) reconstruct a highly accurate 3D mesh from a variety of reality capture data (e.g., laser scans, Kinect™ scans, photos, etc.). Accordingly, embodiments of the invention bring an elegant solution to several problems at once:

- create a unified polygonal description from different sources of data that can be 2D (photos), 3D (scans, polygons), both (RGBD images), CAD model, parametric surface descriptions, etc.;
- Combine information from all original data in an optimal way, in order to produce the surface that best corresponds to all the original data. The approach is collaborative (all data sources participate together in the same minimization process) rather than cumulative (all data sources proceed independently, then results are merged), giving much more guarantees of finding the best solution with high accuracy.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for reconstructing a surface mesh, comprising:
   (a) obtaining photo image data from a set of overlapping photographic images;
   (b) obtaining scan data from a scanner, wherein the scan data comprises depth information;
   (c) generating a point cloud from a variety of sources, wherein the generating comprises combining the overlapping photo image data and the scan data;
   (d) estimating an initial rough mesh from the point cloud data, wherein the initial rough mesh is used as an input mesh; and
   (e) iteratively refining the input mesh into a refined mesh by:
      (1) computing a photo term that measures a surface reprojection error on the set of overlapping photographic images using a photo-consistency measure, wherein the photo-consistency measure determines a consistency between several of the overlapping photographic images;
      (2) computing a scan term that measures a three-dimensional (3D) distance between a surface of the input mesh and the point cloud;
      (3) combining, using a surface cost function, a photo term from the photo image data with a scan term from the scan data;
      (4) evolving the input mesh based on the surface cost function; and
      (5) repeating the above steps until the input mesh minimizes the surface cost function.

2. The computer-implemented method of claim 1, wherein the generating the point cloud from the overlapping photo image data comprises:
   evaluating a photo-consistency score between the set of overlapping photographic images;
   projecting the set of overlapping photographic images onto a moving fronto-parallel plane; and
   maximizing matching photo-consistency scores locally over a depth of the set of overlapping photographic images.

3. The computer-implemented method of claim 1, wherein the generating the point cloud from the scan data comprises:
   collecting three-dimensional (3D) points directly from a scan by the scanner;
   simplifying the scan by removing redundant data.

4. The computer-implemented method of claim 1, wherein the generating the point cloud comprises:
   refining the point cloud;
   clustering the point cloud; and
   filtering the point cloud to remove outliers.

5. The computer-implemented method of claim 1, wherein the refining the initial rough mesh into the refined mesh utilizes an error function that is based on a signed surface distance to the point cloud for the scan data.

6. The computer-implemented method of claim 5, wherein the refining the initial rough mesh into the refined mesh comprises a combination of:
   the error function; and
   a surface reprojection error for the photo image data, wherein the surface reprojection error is based on a photo-consistency score between the set of overlapping photographic images back-projected onto the initial rough mesh.

7. The computer-implemented method of claim 1, further comprising:
   generating a textured surface from the refined mesh based on red, green, blue (RGB) data from the photo image data and/or the scan data; and
   displaying the textured surface.

8. A non-transitory computer readable storage medium encoded with computer program instructions which when accessed by a computer cause the computer to load the program instructions to a memory therein creating a special purpose data structure causing the computer to operate as a specially programmed computer, executing a method of reconstructing a surface mesh, comprising:
   (a) obtaining, in the specially programmed computer, photo image data from a set of overlapping photographic images;
   (b) obtaining, in the specially programmed computer, scan data from a scanner, wherein the scan data comprises depth information;
   (c) generating, in the specially programmed computer, a point cloud from a variety of sources, wherein the generating comprises combining the overlapping photo image data and the scan data;
   (d) estimating, in the specially programmed computer, an initial rough mesh from the point cloud data, wherein the initial rough mesh is used as an input mesh; and
   (e) iteratively refining, in the specially programmed computer, the input mesh into a refined mesh, by:
      (1) computing a photo term that measures a surface reprojection error on the set of overlapping photographic images using a photo-consistency measure, wherein the photo-consistency measure determines a consistency between several of the overlapping photographic images;
      (2) computing a scan term that measures a three-dimensional (3D) distance between a surface of the input mesh and the point cloud;
      (3) combining, using a surface cost function, a photo term from the photo image data with a scan term from the scan data;
      (4) evolving the input mesh based on the surface cost function; and (5) repeating the above steps until the input mesh minimizes the surface cost function.

9. The non-transitory computer readable storage medium of claim 8, wherein the generating the point cloud from the overlapping photo image data comprises:
   evaluating, in the specially programmed computer, a photo-consistency score between the set of overlapping photographic images;
   projecting, in the specially programmed computer, the set of overlapping photographic images onto a moving fronto-parallel plane; and
   maximizing, in the specially programmed computer, matching photo-consistency scores locally over a depth of the set of overlapping photographic images.

10. The non-transitory computer readable storage medium of claim 8, wherein the generating the point cloud from the scan data comprises:
    collecting, in the specially programmed computer, three-dimensional (3D) points directly from a scan by the scanner;
    simplifying, in the specially programmed computer, the scan by removing redundant data.

11. The non-transitory computer readable storage medium of claim 8, wherein the generating the point cloud comprises:
    refining, in the specially programmed computer, the point cloud;
    clustering, in the specially programmed computer, the point cloud; and
    filtering, in the specially programmed computer, the point cloud to remove outliers.

12. The non-transitory computer readable storage medium of claim 8, wherein the refining the initial rough mesh into the refined mesh utilizes an error function that is based on a signed surface distance to the point cloud for the scan data.

13. The non-transitory computer readable storage medium of claim 12, wherein the refining the initial rough mesh into the refined mesh comprises a combination of:
    the error function; and
    a surface reprojection error for the photo image data, wherein the surface reprojection error is based on a photo-consistency score between the set of overlapping photographic images back-projected onto the initial rough mesh.

14. The non-transitory computer readable storage medium of claim 8, further comprising:
    generating, in the specially programmed computer, a textured surface from the refined mesh based on red, green, blue (RGB) data from the photo image data and/or the scan data; and
    displaying, via the specially programmed computer, the textured surface.

15. The computer-implemented method of claim 1, wherein:
    the surface cost function comprises computing a global score for each element of the mesh surface;
    the global score comprises computing a displacement, wherein the displacement comprises a combination of all displacement contributions, for each element of the mesh surface, acquired from the from the photo term and the scan term; and
    the surface cost function minimizes the global score based on the displacement.

16. The non-transitory computer readable storage medium of claim 8, wherein:
    the surface cost function comprises computing a global score for each element of the mesh surface;
    the global score comprises computing a displacement, wherein the displacement comprises a combination of all displacement contributions, for each element of the mesh surface, acquired from the from the photo term and the scan term; and
    the surface cost function minimizes the global score based on the displacement.

* * * * *